US008548877B2

(12) United States Patent
Bulman et al.

(10) Patent No.: US 8,548,877 B2
(45) Date of Patent: Oct. 1, 2013

(54) EXPENSE TRACKING, ELECTRONIC ORDERING, INVOICE PRESENTMENT, AND PAYMENT SYSTEM AND METHOD

(75) Inventors: Russell G. Bulman, West Palm Beach, FL (US); Sandra R. Blum, Lake Worth, FL (US)

(73) Assignee: Altisource Solutions S.à r.l., Luxembourg (LU)

( * ) Notice: Subject to any disclaimer, the term of this patent is extended or adjusted under 35 U.S.C. 154(b) by 0 days.

(21) Appl. No.: 13/608,747

(22) Filed: Sep. 10, 2012

(65) Prior Publication Data

US 2013/0006854 A1 Jan. 3, 2013

Related U.S. Application Data

(60) Continuation of application No. 12/404,958, filed on Mar. 16, 2009, now Pat. No. 8,266,028, which is a continuation-in-part of application No. 12/111,794, filed on Apr. 29, 2008, now Pat. No. 8,005,730, which is a division of application No. 10/729,019, filed on Dec. 8, 2003, now Pat. No. 7,412,418.

(60) Provisional application No. 61/064,605, filed on Mar. 14, 2008, provisional application No. 60/495,103, filed on Aug. 15, 2003, provisional application No. 60/431,438, filed on Dec. 6, 2002.

(51) Int. Cl.
*G06Q 30/00* (2012.01)
*G06Q 40/00* (2012.01)
*G07F 19/00* (2006.01)

(52) U.S. Cl.
USPC .............................. 705/26.81; 705/34; 705/40

(58) Field of Classification Search
USPC .................. 705/26.1, 26.8, 26.81, 37, 34, 40
See application file for complete search history.

(56) References Cited

U.S. PATENT DOCUMENTS

| 5,283,828 | A | 2/1994 | Saunders et al. |
| 6,167,385 | A * | 12/2000 | Hartley-Urquhart ........... 705/35 |
| 6,360,311 | B1 | 3/2002 | Zandveld et al. |
| 6,418,416 | B1 | 7/2002 | Rosenberg et al. |
| 6,578,015 | B1 | 6/2003 | Haseltine et al. |
| 6,687,713 | B2 | 2/2004 | Mattson et al. |
| 6,868,413 | B1 | 3/2005 | Grindrod et al. |
| 6,882,986 | B1 * | 4/2005 | Heinemann et al. ............ 705/40 |
| 6,928,411 | B1 | 8/2005 | Fox et al. |
| 7,013,289 | B2 | 3/2006 | Horn et al. |
| 7,050,874 | B1 | 5/2006 | Tenorio |
| 7,110,976 | B2 | 9/2006 | Heimermann et al. |
| 7,110,979 | B2 | 9/2006 | Tree |
| 7,155,403 | B2 | 12/2006 | Cirulli et al. |
| 7,412,409 | B2 | 8/2008 | Aliabadi et al. |
| 7,416,131 | B2 | 8/2008 | Fortune et al. |
| 7,437,327 | B2 | 10/2008 | Lam et al. |

(Continued)

OTHER PUBLICATIONS

Albert J. Enzweiler; The "Sizzle" in Client/Server Systems, Management Accounting; v77n8; pp. 22-20; Feb. 1996.

(Continued)

*Primary Examiner* — Jagdish Patel
(74) *Attorney, Agent, or Firm* — Shaun B. Sethna (57) ABSTRACT

Systems and methods are described for electronic invoice presentment and payment processing. Requestors may place an order to purchase goods or services from one or more vendors. Invoice processing includes approval routing and dispute resolution.

20 Claims, 12 Drawing Sheets

(56) References Cited

U.S. PATENT DOCUMENTS

| | | | |
|---|---|---|---|
| 7,444,298 B2* | 10/2008 | Gilberto et al. | 705/26.81 |
| 7,711,191 B2 | 5/2010 | Kosek et al. | |
| 7,827,103 B1 | 11/2010 | Fu et al. | |
| 8,027,892 B2* | 9/2011 | Baumann et al. | 705/34 |
| 2001/0056362 A1 | 12/2001 | Hanagan et al. | |
| 2002/0065736 A1* | 5/2002 | Willner et al. | 705/26 |
| 2002/0111842 A1 | 8/2002 | Miles | |
| 2002/0156797 A1 | 10/2002 | Lee et al. | |
| 2003/0220855 A1 | 11/2003 | Lam et al. | |
| 2004/0044602 A1 | 3/2004 | Batur et al. | |
| 2004/0044603 A1 | 3/2004 | Gordon-Ervin et al. | |
| 2004/0064389 A1 | 4/2004 | Force et al. | |
| 2004/0078288 A1 | 4/2004 | Forbis et al. | |
| 2005/0075978 A1 | 4/2005 | Leavitt et al. | |
| 2008/0152209 A1 | 6/2008 | Kosek et al. | |
| 2009/0030811 A1* | 1/2009 | Gilberto et al. | 705/26 |

OTHER PUBLICATIONS

Final Office Action, dated Jun. 7, 2012, from corresponding U.S. Appl. No. 12/723,371.

Notice of Allowance, dated Mar. 14, 2012, from corresponding U.S. Appl. No. 13/214,283.

Office Action, dated Feb. 13, 2012, from corresponding U.S. Appl. No. 12/723,371.

Ralph Kimball; "Track Your Department Budgets, Commitments, and Actuals with a Dimensional Model"; Business Wire; Jun. 1, 1999; vol. 2—No. 8.

Related Case—U.S. Appl. No. 12/723,371, filed Mar. 12, 2010, entitled "Expense Tracking, Electronic Ordering, Invoice Presentment, and Payment System and Method," now Publication No. 20110010278.

Related Case—U.S. Appl. No. 13/214,283, filed Aug. 22, 2011, entitled "Expense Tracking, Electronic Ordering, Invoice Presentment, and Payment System and Method," now Publication No. 20110302047.

Verian Technologies; ProcureIT User Manual, version 4.2.5; pp. 264-267, 42-51; Copyright 2000.

Office Action, dated Jan. 22, 2013, from corresponding U.S. Appl. No. 13/214,283.

* cited by examiner

Invoice Queue History Detail Inquiry 502

Created Date: 04/28/2006  Created Time: 13:02:30
Order Number: 8000434368  Invoice #: 16239100
From Queue User ID: rotundo  To Queue User ID:

User Notes On Expense
This work order should be approved because............

[OK] [Cancel] [New]

Q Reason: Management Item Limit Exceeded. (2970 | 2500)

| Appr By Id | Status | User Name |
|---|---|---|
| moreland | Approved | Michael Moreland |
| bankrup | Approved | Bankrupty Assett |

Approval Comments *
[Approve Invoice]
[Reject Invoice]

*Requestor*
*Invoice Comments*

*Invoice Number : CBTrashOut*

| COMMENTS | DATE |
|---|---|
| Kindly give us the break-up of amount for $500.00 for the services Remove trash and debris, Lawn maintenance and Clean interior and kindly request them in their respective workorder. | 4/7/2006 |

| Approve | Reject | Response |

FIG. 7B

*Vendor*
*Invoice Comments*

Invoice Number : *CBTrashOut*

| COMMENTS | DATE |
|---|---|
| This invoice will not be approved for the following reasons: (1) ; (2) ; Please resubmit your invoice. | 4/7/2006 |

Create New Invoice

EXPENSE TRACKING, ELECTRONIC ORDERING, INVOICE PRESENTMENT, AND PAYMENT SYSTEM AND METHOD

CLAIM OF PRIORITY

This application is a continuation of U.S. patent application Ser. No. 12/404,958, entitled "Expense Tracking, Electronic Ordering, Invoice Presentment, and Payment System and Method," filed on Mar. 16, 2009, which claims the benefit of U.S. Provisional Patent Application No. 61/064,605, filed on Mar. 14, 2008, and which is also a continuation-in-part of U.S. patent application Ser. No. 12/111,794, filed on Apr. 29, 2008, now U.S. Pat. No. 8,005,730, issued Aug. 23, 2011, which is a divisional of U.S. patent application Ser. No. 10/729,019, filed on Dec. 8, 2003, now U.S. Pat. No. 7,412,418, issued Aug. 12, 2008, and which claims the benefit of U.S. Provisional Application Ser. No. 60/431,438, entitled "Method and System for Expense Tracking," filed Dec. 6, 2002, and U.S. Provisional Application Ser. No. 60/495,103 entitled "Electronic Ordering, Invoice Presentment, and Payment System and Method," filed Aug. 15, 2003. The entire disclosures of the foregoing applications are incorporated by reference herein.

BACKGROUND OF THE INVENTION

1. Field of the Invention

The present invention relates to a method and system for electronic ordering, invoice presentment, and payment.

2. Background of the Technology

There exist in the art paper-based methods and systems for payment of invoices, but these systems are typically slow and costly for completing such transactions. Automatic payment approval and presentment processes are also known, in which electronic invoices are provided and approved, but these processes do not include all functions necessary for completion of a transaction (including, for example, payment). It is further known to provide electronic payment approval and dispute resolution processes, but without other necessary features for completion of a transaction, such as a payment.

There remains an unmet need in the art to provide a wide range of electronic budgeting, ordering, invoice presentment, and payment functions within a single method and system, which are useful, for example, for large organizations, such as mortgage service companies. There is a further unmet need in the art for a method and system that provides a wide range of such functions, while at the same time providing enhanced customer assistance and improved system integrity issues among interacting systems.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, an electronic invoice presentment and payment system comprises a registration and order fulfillment module for receiving orders from one or more requestors to purchase goods or services from one or more vendors and an invoice processing module for routing and approving invoices for orders placed by the one or more vendors, wherein the invoice processing module includes one or more custom invoice approval rules, the invoice approval rules being customized for each of the one or more requestors.

According to one aspect, a method for electronic invoice processing via a computer, the computer comprising a process comprises receiving a request from a requestor to purchase goods or services from a vendor; generating, by the requestor, a purchase order reflecting the requested purchase; generating, by the vendor, an invoice for the requested purchase; generating, by the requestor, a receiving report or approval of services rendered; determining, via the processor and based on one or more requestor-defined rules, whether the invoice can be approved; and upon approval of the invoice, initiating an automated payment to the vendor.

According to one aspect, a computer-implemented method of resolving dispute associated with an invoice, the computer comprising a data repository, comprise providing an interface for a requestor to accept or reject an invoice; submitting the invoice for payment if the requestor accepts the invoice, the invoice being stored by the data repository; providing an interface for the requestor to enter comments to the vendor indicating the reasons for rejection if the invoice is rejected, the comments being stored in the data repository; and providing an interface for the vendor to respond to a rejected invoice or submit a new invoice, if the invoice is rejected.

According to one aspect, a computer-implemented method of evaluating an invoice for approval, the computer comprising a processor, comprises receiving an invoice; determining, via the processor, whether the invoice total matches the purchase order total indicated on a purchase order associated with the invoice; and if the invoice total does not match the purchase order total, determining, via the processor and based on one or more requestor-defined rules, whether to approve the invoice.

According to one aspect, a system for invoice processing comprises a processor, a user interface for functioning via the processor, and a repository accessible by the repository, wherein a request is received from a requestor to purchase goods or service from a vendor, a purchase order reflecting the requested purchase is generated by the requestor, an invoice for the requested purchase is generated by the vendor, the processor determines based on one or more requestor defined rules, whether the invoice can be approved, and upon approval of the invoice, automatic payment to the vendor is initiated.

According to one aspect, a computer program product comprising computer usable medium having control logic stored therein causing a computer to process an invoice, the control logic comprises first computer readable program code means to generate a request from a requestor to purchase goods or services from a vendor, second computer readable program code means to generate a purchase order reflecting the requested purchase, third computer readable program code means to generate a receiving report or approval for services rendered reflecting the receipt of the requested purchase; fourth computer readable program code means to generate an invoice for the requested purchase, fifth computer readable program code means to determine, based on one or more requestor-defined rules, whether the invoice can be approved, and sixth computer-readable program code means to initiate automatic payment to the vendor upon approval of the invoice.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

DETAILED DESCRIPTION

An electronic invoice presentment and payment (EIPP) system and method are described herein. The EIPP system and method brings the entire invoicing process, from presentment to payment, online using web-based technologies, platforms, and transports.

Figure 1:
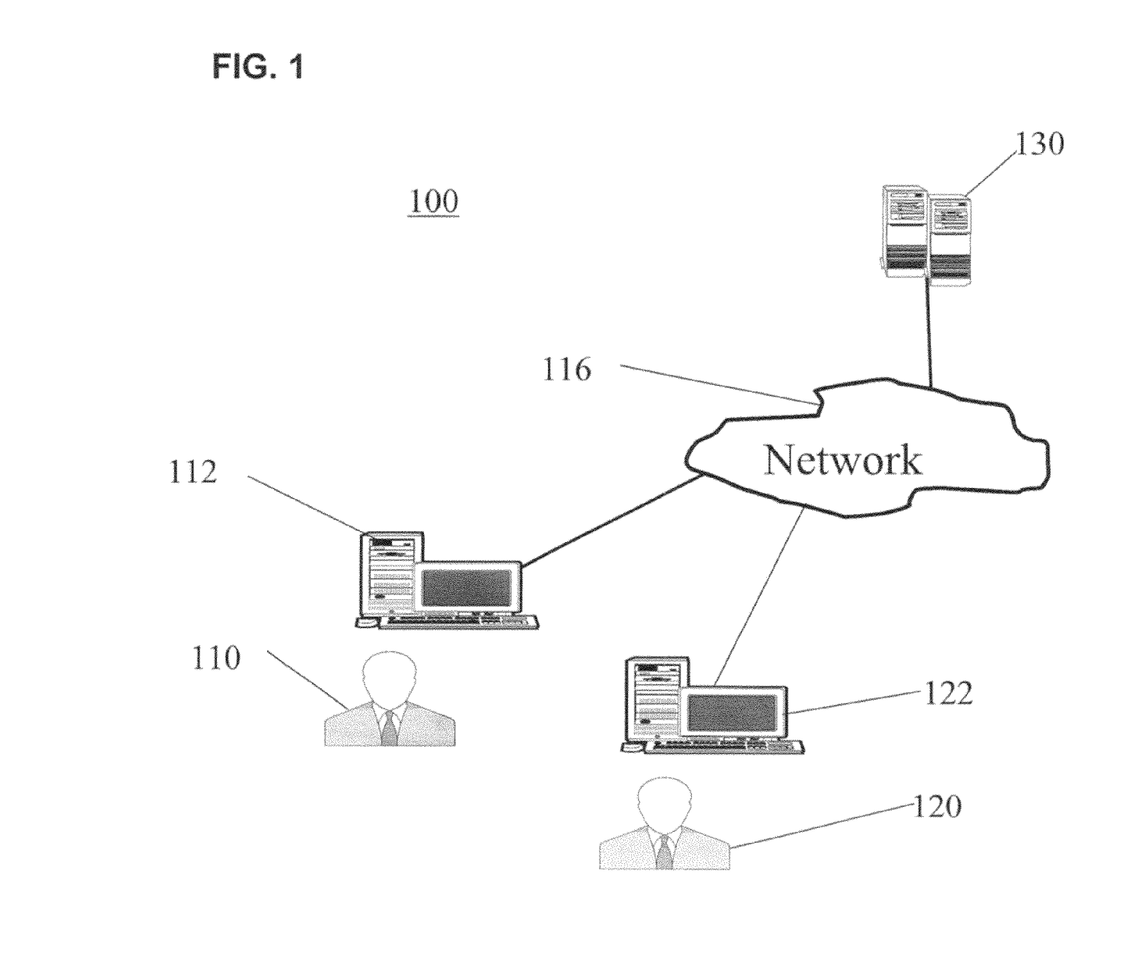
FIG. 1 depicts an exemplary system diagram of various hardware components and other features in accordance with aspects of the present invention.

FIG. 1 depicts an exemplary system diagram 100 of various hardware components and other features in accordance with aspects of the present invention. As depicted in FIG. 1, one or more vendors 110 and requestors 120 may be communicatively coupled to an EIPP server 130 over network 116. Vendors 110 and requestors 120 may access EIPP server 130 via terminals 112 and 122, respectively, which may be a personal computer (PC), microcomputer, mainframe computer, telephone device, PDA, or any other device having a processor and input capability. EIPP server 130 may be a personal computer (PC), microcomputer, mainframe computer or any other device having a processor and repository for data or can interface to a repository for maintained data.

According to some aspects of the invention, requestors may be, for example, real estate owners or other property holders such as a corporation, bank, or other entity having real estate owned properties. The requestors may order one or more services from vendors in connections with the sale or management of a property, or any other transactions.

Figure 2:
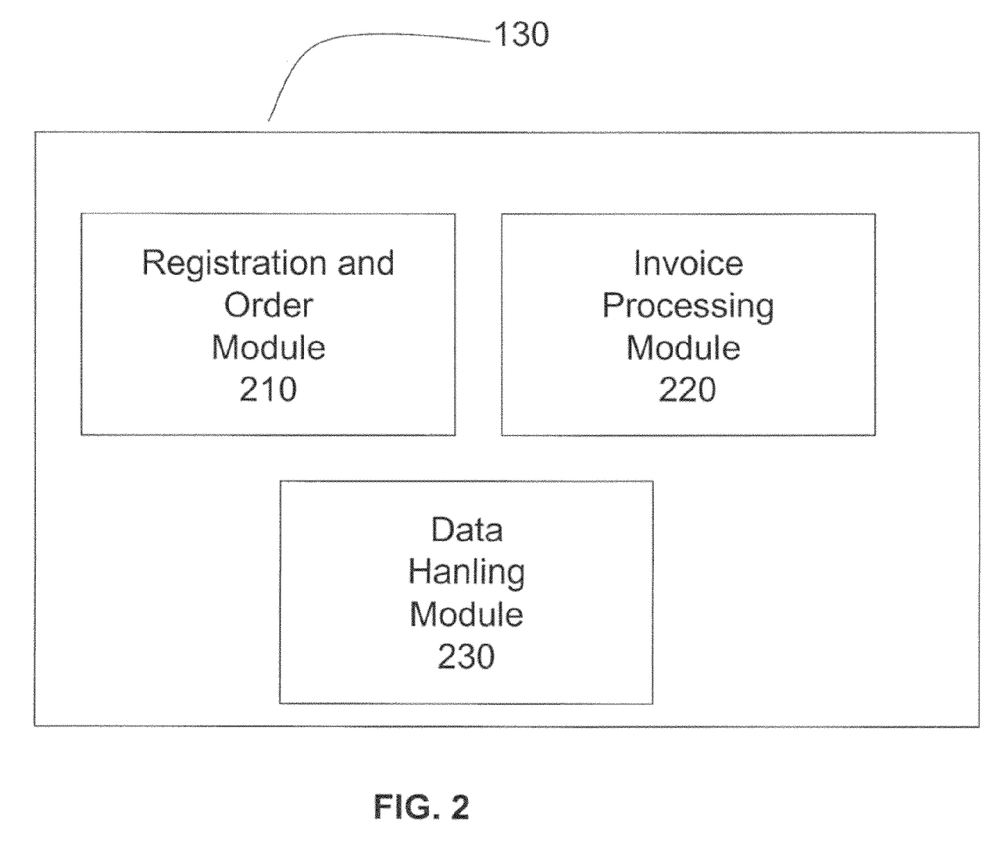
FIG. 2 depicts a high-level block diagram of an EIPP system, in accordance with some aspects of the invention.

EIPP server 130 may comprise a plurality of modules forming an integrated invoice management platform. FIG. 2 depicts a high-level block diagram of an EIPP system 130, in accordance with some aspects of the invention. EIPP system 130 may include a registration and order fulfillment module 210, an invoice processing module 220, and a data handling module 230.

Registration and order fulfillment module 210 may provide for various functions, such as, for example, online vendor registration, submission and review of purchase orders, and creation of receive reports. Invoice processing module 220 may provide tools for approving and routing invoices and for electronic dispute resolution. Data handling module 230 may be configured to format data to be exchanged into various file formats, and to perform validation on file transfer between systems.

Figure 3:
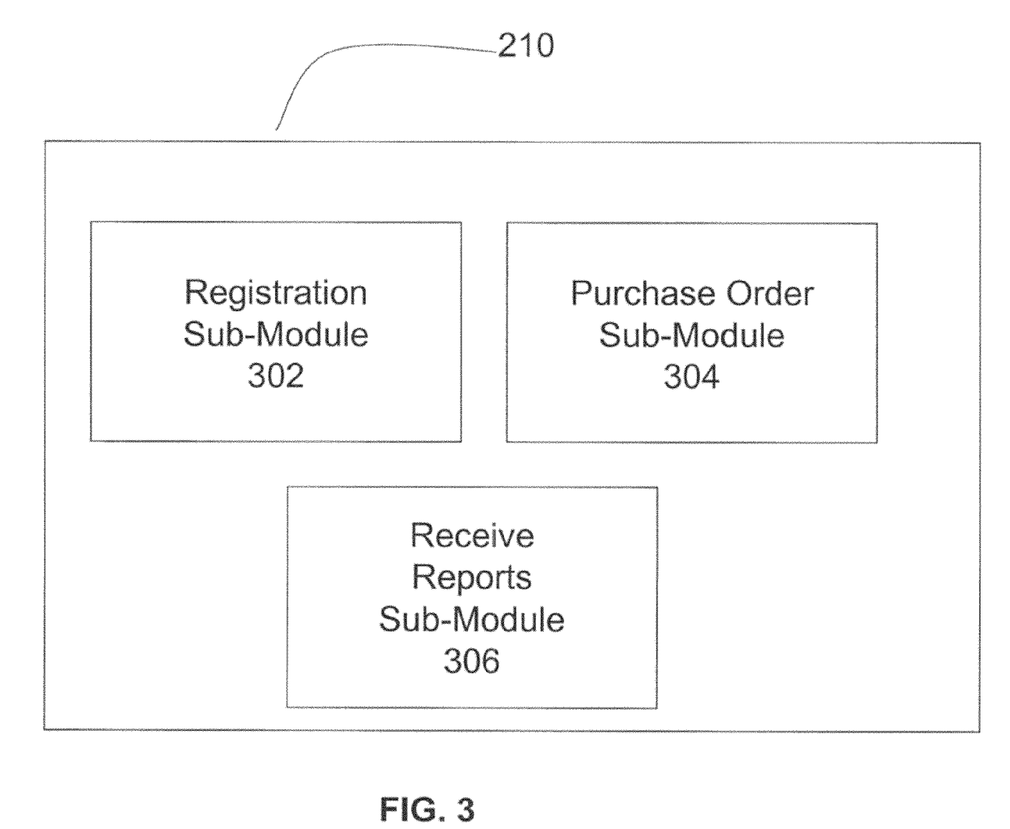
FIG. 3 depicts a registration and order fulfillment module, in accordance with some aspects of the invention.

FIG. 3 depicts registration and order fulfillment module 210 in greater detail. Registration and order fulfillment module 210 may include a registration sub-module 302, a purchase order processing sub-module 304, and a receive reports sub-module 306.

Registration sub-module 302 may provide one or more interfaces, enabling vendors and/or requestors to register to use the EIPP system. Vendor registration may include providing details of the vendor's business such as, for example, the business name, address, phone number, email address, services provided, price list, and/or other vendor information. The vendor may also be required to provide banking information which may be used to remit payments from the requestors. According to some aspects, upon completion of vendor registration, the vendor's information is automatically uploaded to an accounts payable system associated with the requestor(s) to ensure smooth payment processing.

Registration sub-module 302 may also provide interfaces enabling requestors to register. Like vendors, requestors may be required to provide business information, such as business name, address, phone number, and email address. The vendors may also be required to submit banking and/or credit card information for processing payments.

Purchase order processing sub-module 304 may be provided for generating electronic purchase orders. When a requestor wishes to order products and/or services from a vendor, purchase order processing sub-module 304 may generate an electronic purchase order which is transmitted to the vendor.

Receive reports may be used to track items received and accepted by a requestor. As such, receive reports sub-module 306 may be configured to log orders received and accepted, and to generate a report. Similarly, in the case of services, receive reports sub-module 306 may be configured to log a requestor's approval of services rendered. The receive reports may be used to validate invoices. For example, if a requestor orders 100 air-conditioners from a vendor and receives 78 units, a receive report is generated indicating that 78 units were delivered. If the requestor accepts the 78 units, the report also indicates that the 78 units were accepted.

Referring again to FIG. 2, invoice processing module 220 may provide tools for processing invoices including, for example, tools for approving invoices and for routing invoices to the appropriate parties for approval as needed. Some invoices may be approved automatically while others may require approval by one or more approvers designated by the requestor. According to some aspects of the invention, invoice processing module 220 may be used in conjunction with client-defined rules to evaluate an invoice for automatic approval.

Client-defined rules may include rules that define whether an invoice may be automatically approved based on the quantity of goods delivered, the invoice price, delivery dates, and/or other factors. For example, a client may configure rules indicating that a delivery date cannot exceed a predetermined amount of days after the expected received date indicated on the order report. As other examples, a client may configure rules indicating that an invoice price can or cannot exceed the order price, or that a quantity of goods received can or cannot exceed an amount ordered.

Figure 4:
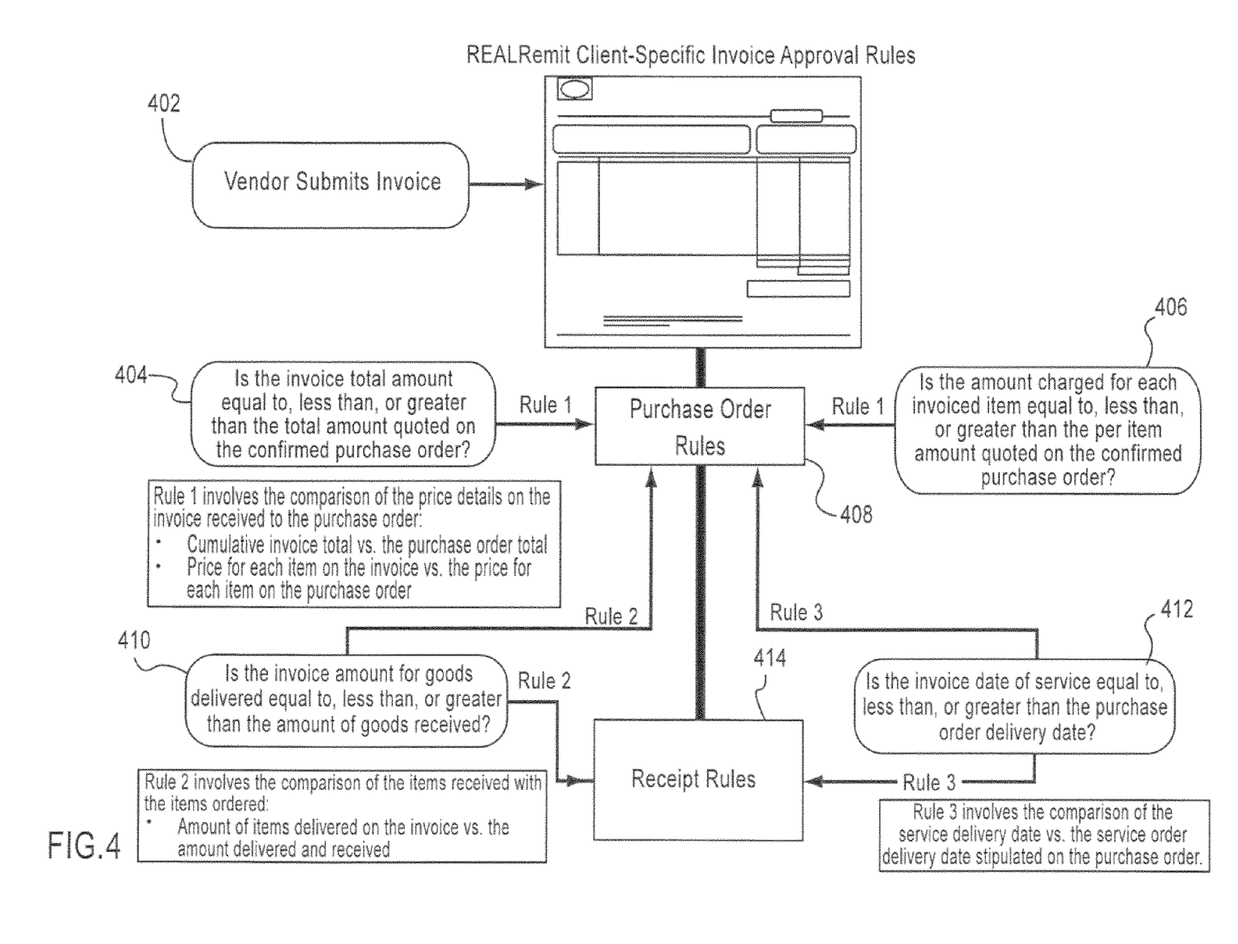
FIG. 4 is a flowchart depicting a client rules approval process, in accordance with some aspects of the invention.

To determine whether an invoice can be approved automatically based on user configured rules such as the examples described above, a rules engine may be provided as a configurable set of database tables that establish relationships, comparisons, and resulting actions amongst invoice, order, and receiving report data attributes. FIG. 4 is a flowchart depicting a client rules approval process. As depicted in FIG. 4, the rules engine may use a three-way mapping of the receive report, the purchase order, and the invoice to determine whether an invoice may be approved. The purchase order indicates the goods and/or services initially requested by the requestor. The receive report indicates that the requestor has accepted or approved the delivered goods or services, and the invoice represents the goods and/or services billed by the client. Accordingly, the rules engine may validate an invoice by comparing the values of all three reports.

As depicted at 402, the process begins when a vendor submits an invoice. As depicted at 404, the invoice validation and approval sub-module may determine whether the invoice total amount is equal to, greater than, or less than the total amount quoted on the confirmed purchase order. As depicted at 406, the invoice validation and approval sub-module may also determine whether the amount charged for each invoice item is equal to, less than, or greater than the per item amount quoted on the purchase order. The inquiries depicted at 404 and 406 are evaluated using purchase order rules 408.

The price details on the invoice received may be compared to the details on the purchase order. For example, the cumulative invoice total may be compared to the purchase order total. Likewise, the price for each item on the invoice may be compared to the price for each item on the purchase order. Purchase order rules 408, which are pre-configured by the client/requestor, indicate whether the invoice should be approved.

As depicted at 410, it is determined whether the amount of goods delivered is equal to, less than, or greater than the amount of goods received. That is, the amount of items delivered on the invoice is compared to the amount of items delivered and received. As depicted at 412, the invoice date of service may be compared to the purchase order delivery date. This includes a comparison of the service delivery date against the service order delivery data specified on the purchase order. As the inquiries performed at steps 410 and 412 include evaluating invoices in light of both a purchase order and a receive report, the inquiries are processed by purchase order rules 408 and receipt rule 414. Like the purchase order rules, receipt rules may be preconfigured by the client/requestor.

Figure 5:
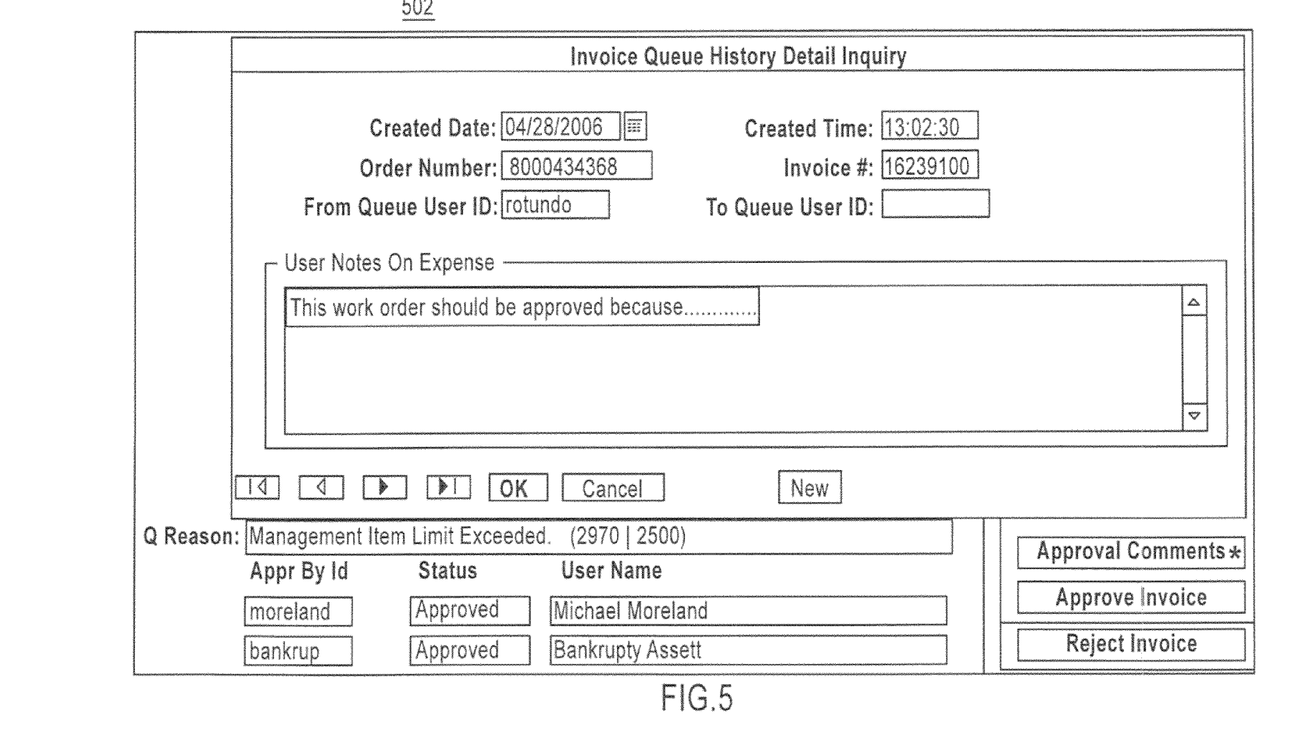
FIG. 5 depicts an exemplary approval routing screen, according to some aspects of the invention.

Invoices that cannot be automatically approved may require approval by one or more designated approvers. FIG. 5 depicts an example of an approval routing screen 502. As depicted, the approval routing form indicates the invoice number as well as the date and time the invoice was created. The invoice approval form may also include reasons why approval is needed. For example, approval may be needed because the cost of the invoice exceeds a predefined threshold. The approver may select from buttons or other selection mechanisms to approve the invoice or reject the invoice. The user may also include approval comments by selecting the appropriate button. According to some aspects of the invention, multiple parties may be required to approve an invoice. As such, the invoice approval screen may display the entire approval routing, including the order of the current reviewer within the overall process. If the invoice is rejected, the vendor may be sent an email or other indication of such rejection and, e.g., a link to the EIPP system to obtain further details.

Figure 6:
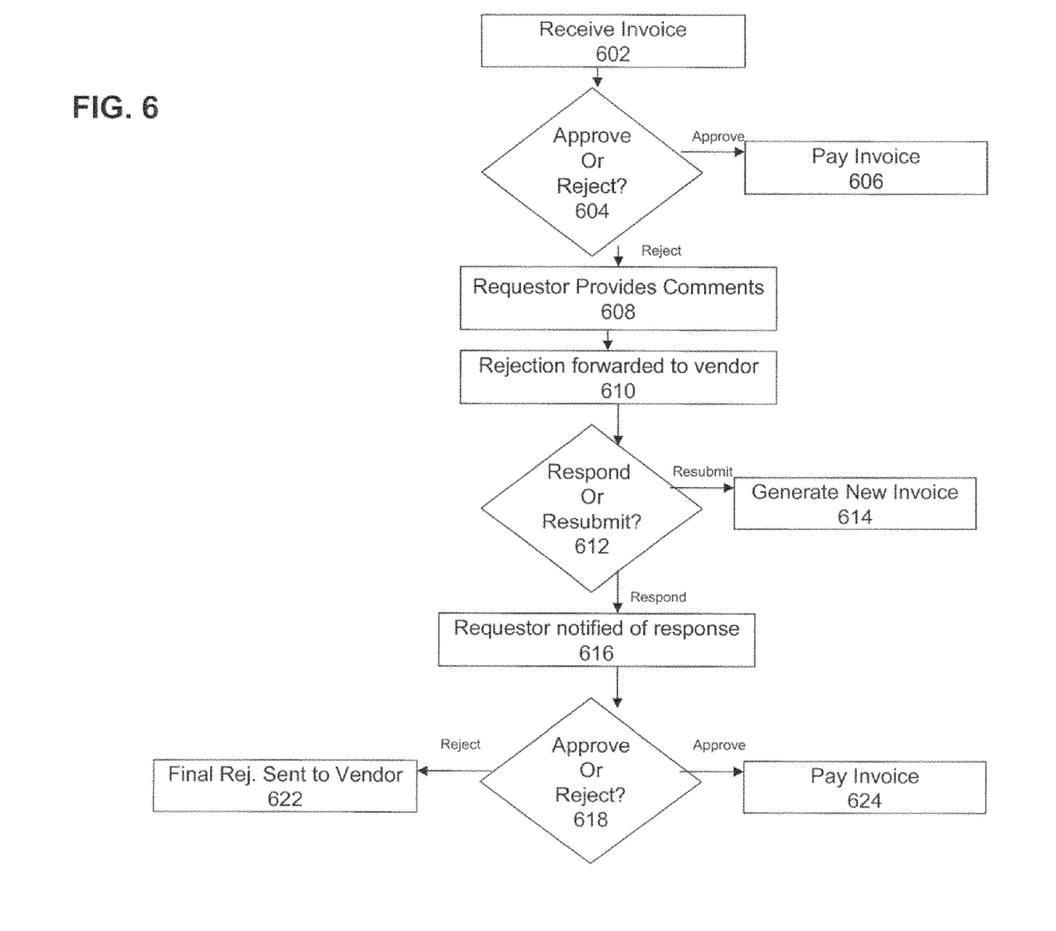
FIG. 6 is a flowchart depicting a dispute resolution process, in accordance with some aspects of the invention.

Invoice processing module 220 may also provide tools for online dispute resolution. Online dispute resolution enables a vendor to view comments associated with rejected invoices, and respond to the rejection or resubmit the invoice. FIG. 6 is a flowchart depicting a dispute resolution process, in accordance with some aspects of the invention. As depicted at 602, a requestor may receive an invoice detailing the products ordered and delivered, as well as the cost. Upon reviewing the invoice, the requestor may determine whether or not to approve the invoice, as depicted at 604. If the invoice is approved, it is paid, as depicted at 606.

However, if the invoice is not approved, the requestor may enter comments into the EIPP system detailing the reasons for the rejection, as depicted at 608. The vendor may then be notified by email or other means of the rejection, as depicted at 610. The notification may include the order number and invoice number associated with the rejected invoice. The notification may further include, e.g., a link to the submitted invoice.

Upon receipt of notification that an invoice has been rejected and upon selection of the link to access the invoice, the vendor may decide to respond to the rejection, or to resubmit the invoice, as depicted at 612. If the vendor decides to resubmit, the vendor may generate a new invoice and forward it to the requestor, as depicted at 614. However, if the vendor chooses to respond rather than resubmit, a response may be send via email or other means to the requestor, as depicted at 616. The vendor may provide comments indicating why the invoice should be approved.

As depicted at 618, the requestor may then receive an email or other notification that the vendor has responded to the rejection of the invoice. According to some aspects, the notification may provide options for approving or rejecting the invoice again right from the email. For example, the email message may include an approve button and a reject button, each of which, when selected, would transmit the appropriate message to the vendor. In other aspects, the email message may contain a link to the EIPP system where the requestor can review the vendor's comments and decide whether to approve the invoice or reject it again. As depicted at 620, the requestor determines whether to approve or reject the invoice.

If the requestor again rejects the invoice, a "final message may be sent to the vendor indicating the rejection, as depicted at 622. The message may include details about the final rejection, and instructions to submit a new invoice. According to some aspects, the new invoice may be created directly from the email or other message. In other aspects, the vendor may be directed to log into the EIPP system to create a new invoice. If the requestor chooses to approve the invoice, as depicted at 624, the invoice is paid.

Figure 7A:
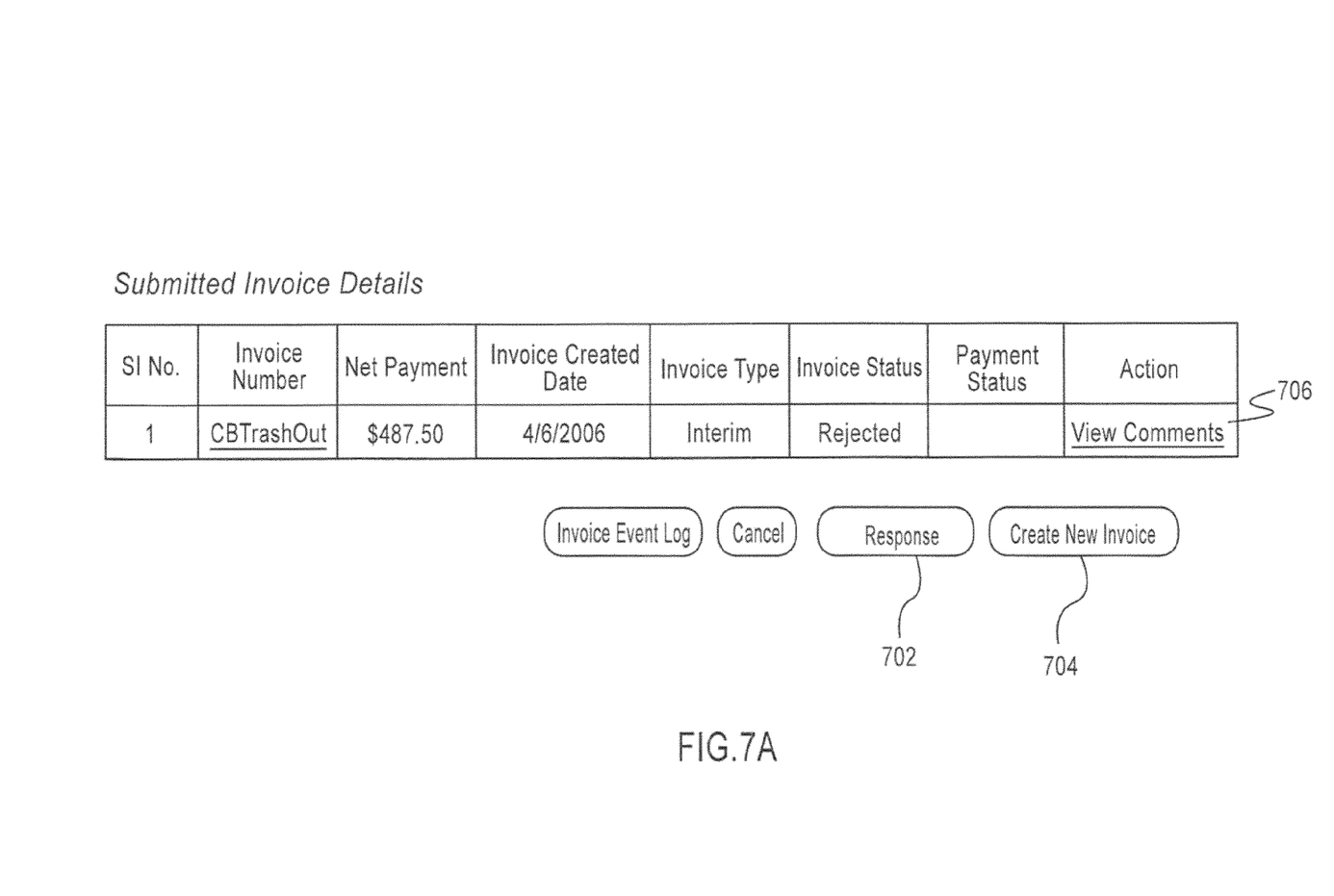
FIGS. 7A-7C are exemplary screen shots depicting various aspects of dispute resolution, in accordance with some aspects of the invention.
Figure 7B:
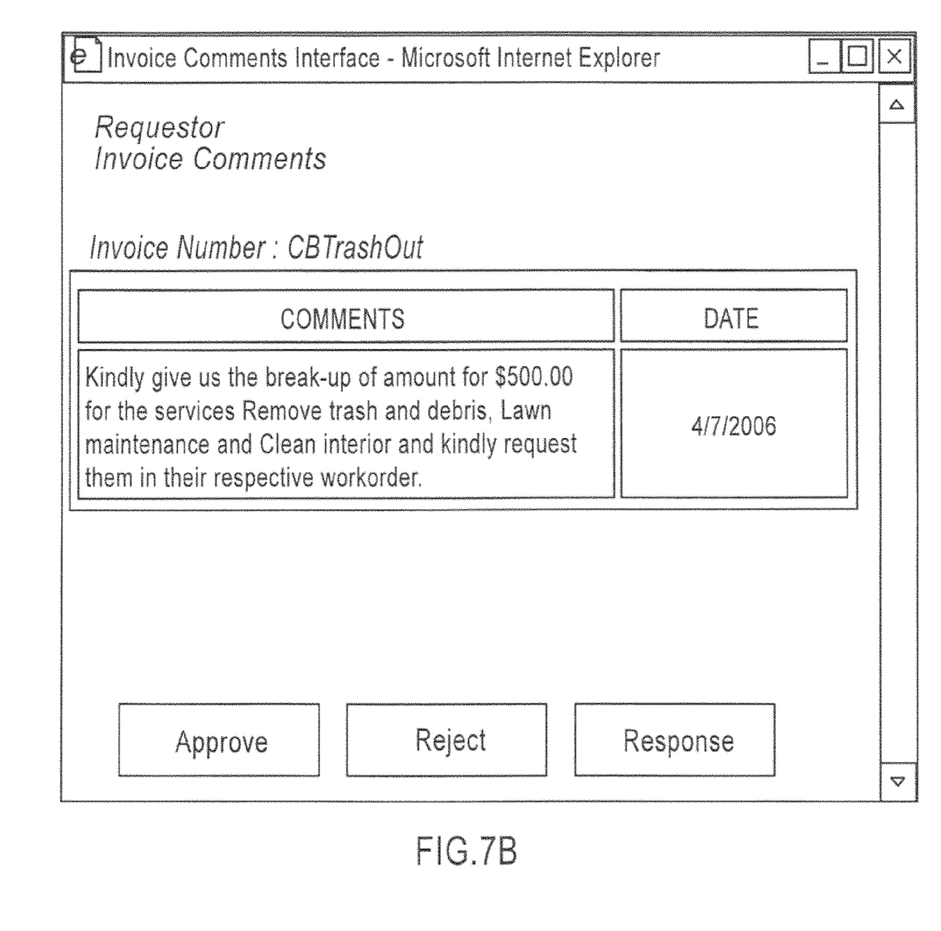
Figure 7C:
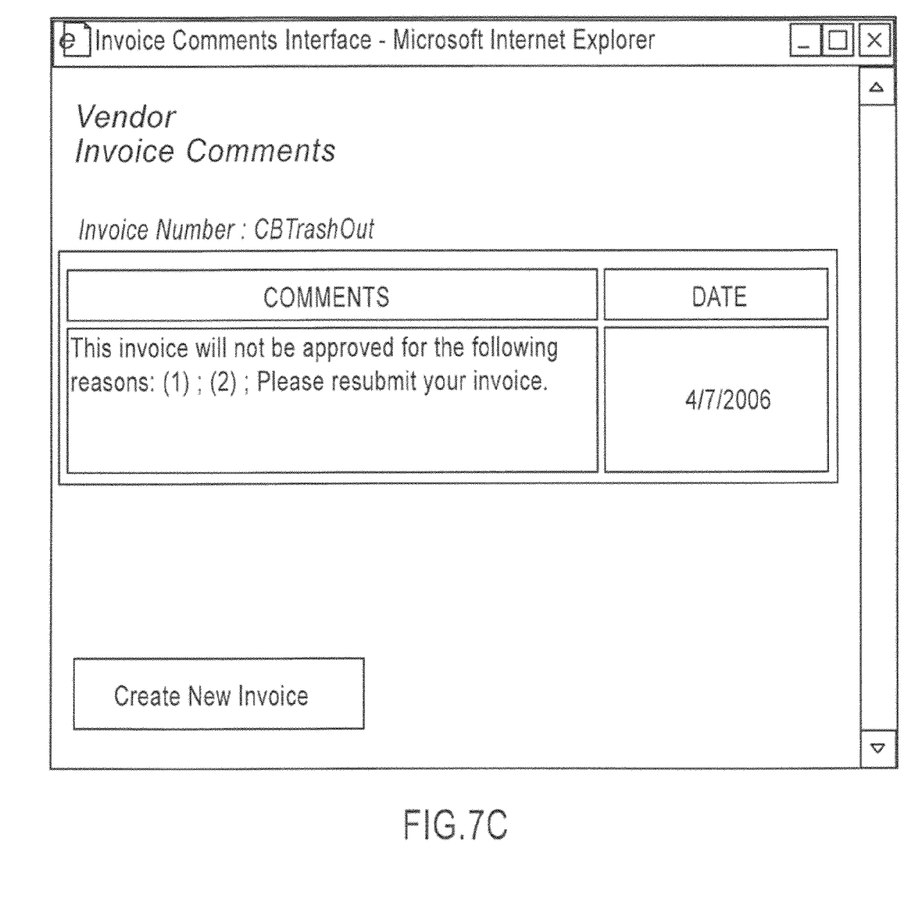

FIGS. 7A-7C depict various screenshots, graphical user interface screens, and message windows which may be presented during a dispute resolution process, according to some aspects of the invention. As depicted in FIG. 7A, a Submitted invoice Details window displays the status of a pending invoice. For example, invoice number CBTrashOut, depicted in FIG. 7A, has been rejected. A vendor reviewing this screen has the option to submit a response or to create a new invoice, as depicted at 702 and 704, respectively. The user may also view comments associated with the rejection, by selecting the link depicted at 706.

FIG. 7B is an example of an Invoice Comments Interface. This interface may be provided to a requestor after a vendor has entered comments regarding an initial rejection of an invoice. The requestor may then approve, reject, or respond to the requestor. FIG. 7C depicts an example final rejection email which may be provided to a vendor after an invoice has been twice rejected. In this example, the requestor's only option is to create a new invoice.

According to some aspects of the invention, an EIPP system may interact with and exchange data with a plurality of sources. As such, data handling module 230 may enable the EIPP system to transmit data in a variety of file formats. For example, the EIPP system may be configured to support fixed flat files, pipe delivered files, comma separated files, Excel™ files, XML files, and/or other file types.

Moreover, to avoid problems associated with missing data transfer, data handling module 230 may be configured to log errors occurring during a transfer process. Upon logging an error, a system administrator may be notified of the location of the error log. Any transaction associated with the error may be re-transmitted after the error has been researched and corrected. According to some aspects of the invention, a report may be generated when data is successfully sent and confirmation has been received.

According to some aspects of the invention, approved invoices may be interfaced with a requestor's accounts payable system. Invoices may be paid directly via direct deposit to the vendor's bank account after an invoice has been approved. The vendor may be notified of the payment, for example, via email. Other notification methods, such as facsimile may also be used. Vendors may also view their invoices and payment status by logging into the EIPP interface.

Figure 8:
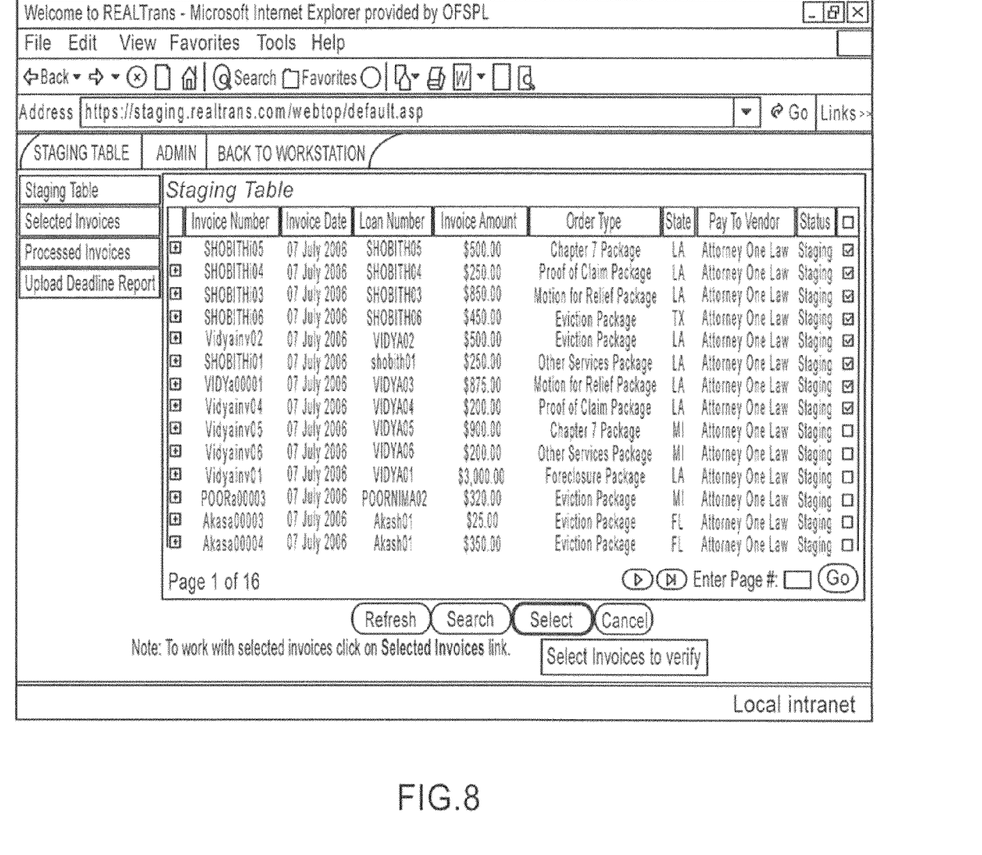
FIGS. 8 and 9 are exemplary screen shots, in accordance with some aspects of the invention.
Figure 9:
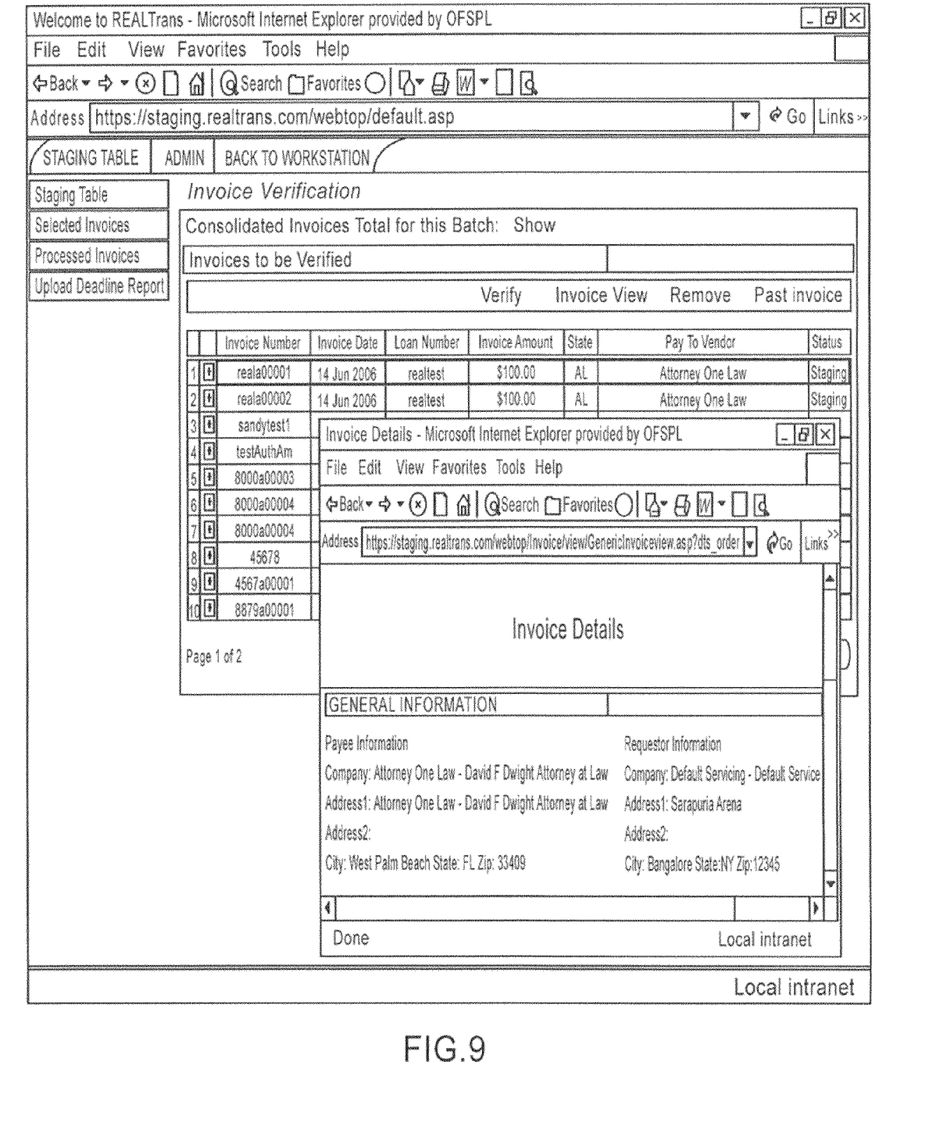

FIG. 8 is a screen shot of an EIPP work area. The work area may present a list of all invoices, and indicate the status of the invoice. Invoices may be worked on by multiple users. Selecting an invoice may bring up the invoice details, as depicted in FIG. 9.

Figure 10:
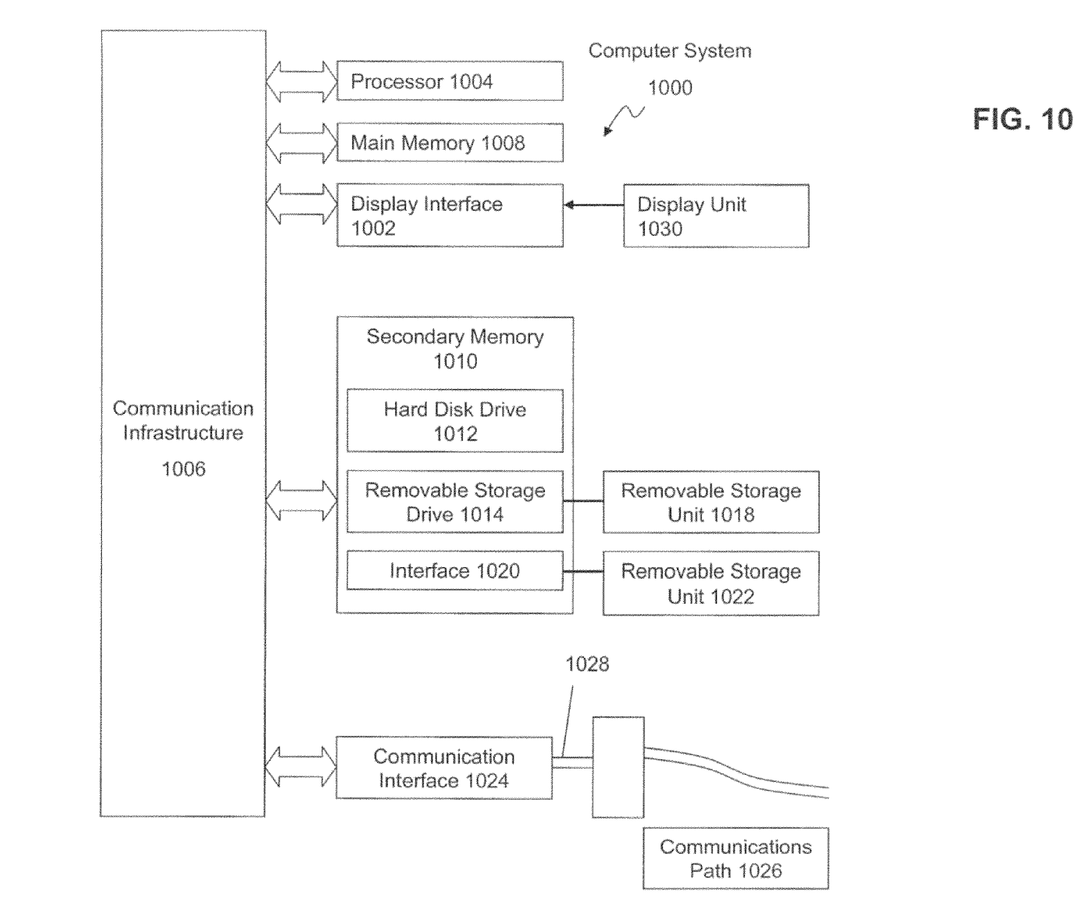
FIG. 10 depicts a computer system for implementing various aspects of the present invention.

The present invention may be implemented using a combination of hardware, software and firmware in a computer system. In an aspect of the present invention, the invention is directed toward one or more computer systems capable of carrying out the functionality described herein. An example of such a computer system 1000 is shown in FIG. 10.

Computer system 1000 includes one or more processors, such as processor 1004. The processor 1004 is connected to a communication infrastructure 1006 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 1000 can include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018, represents a floppy disk, magnetic tape, optical disk, etc., which is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1080, a hard disk installed in hard disk drive 1070, and signals 1028. These computer program products provide software to the computer system 1000. The invention is directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features of the present invention, as discussed herein. In particular, the computer programs, when executed, enable the processor 1010 to perform the features of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions of the invention as described herein. In another aspect of the present invention, the invention is implemented primarily in hardware using, for example, hardware components, such as application specific integrated circuits (ASICs). Implementation of the hardware state machine so as to perform the functions described herein will be apparent to persons skilled in the relevant art(s).

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:
1. A system for processing an invoice comprising:
at least one processor;
an invoice receiving module for receiving, with the at least one processor, the invoice for an item ordered by a requester;

an approval module for processing, with the at least one processor, the invoice through an approval and payment process, the approval module processing the invoice based on a plurality of approval rules that are based on the item ordered and defined by the requester; and a payment module for submitting, with the at least one processor, payment in response to approved invoices.

2. The system of claim 1, wherein the item comprises a service.

3. The system of claim 1, wherein the approval rules comprise a rule based on at least one of a price of the item ordered or a delivery date of the item.

4. The system of claim 1, further comprising a rejection module for rejecting, with the at least one processor, the invoice in response to a determination by the decision module that the invoice total does not match the purchase order total indicated on the purchase order associated with the invoice.

5. The system of claim 1, wherein the payment module submits payment of the invoice in response to receiving an indication from the approval module that the invoice has been approved.

6. The system of claim 1, wherein the approval module comprises an interface for a requester to accept or reject the invoice.

7. The system of claim 6, further comprising a data repository in communication with the approval module and a dispute resolution module, the dispute resolution module comprising an interface for the requester to enter comments to a vendor associated with a rejected invoice indicating the reasons for rejection, the comments being stored in the data repository.

8. The system of claim 1, further comprising an invoice matching module for determining, with the at least one processor, whether an invoice total on the invoice matches a purchase order total indicated on a purchase order associated with the invoice.

9. A non-transitory computer-readable medium having computer-readable program code embodied therein for resolving a dispute associated with an invoice, the computer-readable program code comprising:
   computer-readable instructions for receiving an invoice for an item from a vendor;
   computer-readable instructions for determining whether an invoice total associated with the invoice matches a purchase order total associated with a purchase order associated with the invoice;
   computer-readable instructions for determining whether to approve the invoice based on two or more requester-defined rules customized for the item ordered, in response to a determination that the invoice total does not match the purchase order total;
   computer-readable instructions for submitting the invoice for payment in response to an approved invoice;
   computer-readable instructions for providing an interface for the requester to enter comments to the vendor indicating the reasons rejecting a rejected invoice, in response to a determination that the invoice was not approved based on the two or more requester-defined rules; and
   computer-readable instructions for providing an interface for the vendor to respond to a rejected invoice or submit a new invoice upon receiving notification of a rejected invoice.

10. The computer-readable medium of claim 9, wherein the requester-defined rules comprise a rule based on a price of the item.

11. The computer-readable medium of claim 9, wherein the invoice identifies at least one item, wherein the purchase order identifies at least one item, and wherein the computer-readable program code further comprises computer-readable instructions for determining whether an invoice amount for each item on the invoice matches a corresponding amount for each item on the purchase order.

12. The computer-readable medium of claim 11, wherein the computer-readable program code further comprises computer-readable instructions for rejecting the invoice in response to a determination that any invoice amount for an item in the invoice exceeds the corresponding amount for the item on the purchase order.

13. The computer-readable medium of claim 9, wherein the requester-defined rules comprise a rule based on a delivery date of the item.

14. The computer-readable medium of claim 9, wherein the interface for the vendor to respond to a rejected invoice or submit a new invoice upon receiving notification of a rejected invoice comprises an interface for the vendor to view comments received from a requester relating to a rejected invoice.

15. An electronic invoice presentment and payment system, comprising:
   at least one processor;
   an invoice receiving module for receiving, with the at least one processor, an invoice for an item ordered by a requester; and
   an invoice processing module for routing and approving, with the at least one processor, the invoice;
   wherein the invoice processing module comprises a plurality of custom invoice approval rules defined by the requester and based on the item ordered.

16. The system of claim 15, wherein the invoice processing module comprises:
   an invoice approval routing module for electronically routing, with the at least one processor, an invoice to one or more approvers.

17. The system of claim 15, wherein the invoice processing module comprises:
   a dispute resolution module for electronically reviewing, with the at least one processor, one or more problems associated with the invoice, the invoice being rejected by the requester.

18. The system of claim 17, wherein the dispute resolution module provides notification to a vendor submitting the invoice that the invoice has been rejected and provides means for responding to the rejection.

19. The system of claim 15, wherein the requester comprises one of: a real estate owner, a property holder, a corporation, or a bank.

20. The system of claim 15, wherein the invoice processing module is further configured to initiate, with the at least one processor, the automatic payment of an invoice upon approval.

* * * * *